United States Patent Office.

WILLIAM HUTSON FORD, J. DICKSON BRUNS, AND L. C. CLARKE, OF NEW ORLEANS, LOUISIANA.

*Letters Patent No. 80,860, dated August 11, 1868.*

IMPROVEMENT IN DISTILLING SPIRITS FROM GRAIN.

*The Schedule referred to in these Letters Patent and making part of the same.*

TO ALL WHOM IT MAY CONCERN:

Be it known that we, WILLIAM H. FORD, J. DICKSON BRUNS, and L. C. CLARKE, all of the city of New Orleans, parish of Orleans, and State of Louisiana, have invented a certain new, useful, and improved Process of Distilling Alcoholic Spirit from Grain and other farinaceous substances; and we hereby declare the following to be a full, clear, and exact description thereof.

We accomplish by our process a complete extraction of all the alcoholic spirit that is contained in the grain or other farinaceous substance that is subjected to it, including slops, in which, usually, it is wasted or lost, and hence we obtain a yield or result from such substance that is very greatly beyond what can be effected by any other existing process of which we have any knowledge.

In the preliminary process of saccharification and fermentation of the substance, whatever it may be, that is necessary to secure the attainment of this end, we boil the said substance in dilute acid, either sulphuric, hydrochloric, or other acid that will produce like effects, in order to convert all the starch therein into glucose, such saccharine matters as may have been originally present, not being changed by the action of the acid except to be transformed into glucose. Nor does the transformation of the starch conclude the effect produced by the action of the acid. We have reason to believe it extends to the mucilage, and that this also is converted into glucose.

After having mixed the materials in the proper proportions, a slow ebullition is obtained by means of steam, until not only starch but also dextrine has wholly disappeared. When this takes place, we know that the conversion into fermentessimal sugar or glucose of all the saccharifiable material has been effected. We determine or ascertain the time of such disappearance and conversion by the application of the usual quantitative tests, and having once ascertained it, the period is permanently fixed and known. The maceration is now completed, and the liquid or mass consists of water, in which is contained the acid that has been added to it, an amount of glucose that depends on the amount of saccharine matters originally contained in the substance acted upon, and the gluten or glutinous material so contained, now in a state of solution.

The acid is neutralized by a proper dose of milk of chalk, carbonate of lime of any pure variety, or any other chemical equivalent of these two substances which will not affect the fermentation injuriously. When this is done, the liquid represents a solution of glucose, in which remains the gluten or glutinous matter on which the fermentation depends, and which, therefore, after being evolved, is ready for the admission of yeast. The fermentation differs notably from the fermentation of liquids resulting from the usual mashing of Indian corn by means of malt. In this last process, as it is usually conducted, the saccharification of the starch is never completed in the mash-tun, the malt there added continuing to act on the fermenting mass throughout the whole period of its fermentation, effecting a gradual but continual transformation of what remains of the starch into sugar. So, likewise, the yeast that is added, containing a certain quantity of malt, produces an effect upon the fermenting mass that goes beyond or is in addition to the effect that is induced by the malt originally put into the mash-tun. It follows, therefore, that inasmuch as the whole amount of sugar is not already formed, the fermentation is never exuberant, and that the process may be conducted, without danger of acetification, at a temperature as high even as 80°. In our process, on the contrary, it is evident that the full amount of saccharine matter which the grain can furnish is already present, and hence, that if yeast be added, unless measures are taken to control the heat of the fermenting mass, a tumultuous fermentation inevitably sets in, and that so much heat will be developed thereby that the temperature will be brought up to the point that will produce acetification, and that a consequent heavy loss of alcohol must follow. In our method of distilling we are, therefore, compelled not only to begin the fermentation at a lower temperature than is ordinarily practised in the usual processes, but to maintain such low temperature by means of cold water that circulates through the mass in small pipes that are properly arranged for the purpose within the tun. We never permit the temperature, in fact, to rise above 72° Fahrenheit, or thereabouts. In the use of yeast, we apply no more than is just sufficient to excite fermentation, and we find that the best yeast for our purpose is the beer-yeast of lager-beer breweries.

We entirely dispense with the use of malt, hops, and like agents, in our fermentation, for there is no necessity whatever for their employment. In fact, after the acid is neutralized, as above stated, our fermentable liquor is closely analogous, in its chemical properties, to the liquid which results from the infusion of malt in the manufacture of lager-beer, and must be similarly treated in the process of its fermentation. The nitrogenous matter of the Indian corn, or other grain used, we have found will remain entirely uninjured during a boiling uninterruptedly continued for thirty-six hours, the sweet liquid resulting, after a proper neutralization of the acid, entering readily and spontaneously, or of its own accord, into fermentation, without an addition of yeast. The use of yeast at all is, in fact, simply to expedite and control the fermentation.

We have found that neither sulphate of lime nor chloride of calcium, resulting from the neutralization of sulphuric or hydrochloric acid, nor carbonate of lime, if present in slight excess, is in any way detrimental in the process of fermentation; but there must be no acid in excess.

Having thus described it in general terms, we proceed now to explain the progressive steps of our process in a detailed manner, and to indicate the proportions of the materials we employ in conducting it.

An amount of water, which may be cold or moderately warm, is allowed to flow into a vessel whose height should never be less than from ten to twelve feet, and into this water is placed the acid, duly weighed. Steam is then admitted into the liquid by means of a perforated copper or lead pipe, and after the liquid has been made to boil, the rye or corn-meal, or other farinaceous matter, very finely ground, is poured in under constant stirring either by hand or machinery. The proportions employed are three and eighty-seven one-hundredths ($3\frac{87}{100}$) cubic feet of water for every fifty-six pounds of corn-meal, for example, and from one to three pounds of hydrochloric acid, or from three-quarters of a pound to two pounds of sulphuric acid.

The quantity of acid necessary for the saccharification of the liquid in any given time varies inversely with the height of the column of boiling material; thus, we have found that when the columnar height of the liquid is ten feet, one pound of sulphuric or two pounds of hydrochloric acid will completely saccharify the material in twenty-three hours' boiling. On this principle the boiling is continued in the macerating-vessel for an hour or two after the disappearance of dextrine, and until the formation of sugar has reached its maximum, which we ascertain by the application of Fehling's cupro-potassic-test liquid, when the liquid is run out into a cooling-vessel, where it is allowed to cool down to a temperature of 120°. As soon as this occurs, milk of chalk or carbonate of lime, of any pure variety, is allowed to flow in until a solution of litmus will cease to be reddened.

One pound of chalk will slightly supersaturate one pound of hydrochloric acid, and one pound and a half will neutralize one pound of sulphuric acid. This being ascertained, the whole amount of chalk for any given mass or amount of material may be determined beforehand, and weighed out at one time, and poured into the cooler, then thoroughly incorporated with the mass by mechanical agitation, care being taken not to have the cooler filled to within less than three or four inches of the top. It is then covered with a cover made of any desired form, and as nearly air-tight as is convenient. The carbonic-acid gas, which is given off during the effervescence consequent upon the process of neutralization, will fill the upper part of the cooler, lying quietly upon the surface of the liquid, and protecting it perfectly from contact with the oxygen of the air, thus avoiding all danger of fermentation while the mass is being cooled to a point so low that there is no risk of acetous fermentation, say about 68° Fahrenheit.

We now draw the liquid off into the fermenting-tun, the depth of which shall not exceed thirty-eight per cent. of its inside diameter, and it is ready for the admission of yeast. Two pounds of fresh top lager-beer yeast is sufficient for each fifty-six pounds of farinaceous matter that are used. If too dense, the liquid is diluted with cold water to a density of $6\frac{1}{2}°$ or 7° Baume.

In order that the carbonic acid evolved during the fermentation may completely pass off, and that there may be afforded due access of atmospheric oxygen, it is necessary that the liquid shall completely fill the fermenting-tun. This necessity arises out of the fact that if the liquid does not fill the vessel, the changing nitrogenous matter that is present therein acts upon the sugar and deoxidizes it, and thus causes a heavy loss of alcohol. On the contrary, when the liquid is properly exposed to the air, at a temperature not exceeding 72°, while the alcohol, progressively formed, is in no danger of acetification, the demand for oxygen on the part of the gluten of the liquid is satisfied from the atmosphere, and not at the expense of the sugar. The theory of the process in this respect is similar to that which is practised in the manufacture of Bavarian beer, or lager-beer, as made in this country.

To prevent the exuberant fermentation which would otherwise occur in a liquid so rich in sugar, it is necessary to control the temperature throughout the entire fermentation. This is accomplished by casing the internal surfaces of the fermenting-tun, sides or bottom, or both, if necessary, with sheet iron or copper, separated from the wood-work of the tun by laths or strips of wood, between which a current of cold or hot water may be introduced if necessary, in order to regulate and prevent the temperature from ever rising above 72° Fahrenheit. The period of fermentation is generally about two days and a half or three days.

The liquid is now ready for distillation, which may be effected in any variety of "still," because the materials are so finely comminuted by the prolonged maceration as to completely remove all danger of obstruction in the small pipes or orifices of even the most complicated stills. In fact, the still that is best adapted to our use, is the still that is employed in the distillation of rum from molasses.

In conclusion, we desire to state, in illustration and proof of the importance and value of our invention, that we have obtained in its practice as much as five gallons of proof whiskey from fifty-six pounds of unbolted Indian-corn meal, without any admixture of any other farinaceous substance or matter, at an expense of one pound of sulphuric acid, and one pound and a half of chalk, and two pounds of lager-beer yeast, as will be perceived by reverting to our statement of the proportions of these materials that are used by us with such quantum of meal. And this whiskey was of excellent quality, and unusually free of impurities.

In fact it is clear that in consequence of the prolonged maceration that is incident to our process, all fœtid volatile matters, which, by the processes hitherto practised, are passed over into the still, must be and are driven off by the action of the steam during the maceration, and therefore before the distillation commences.

Having thus described our invention, what we claim, and desire to secure by Letters Patent, is—

The process of neutralizing the acid and controlling the fermentation of mash from grain, or other farinaceous substance, which has been boiled or otherwise treated with acids for the purpose of effecting a more complete saccharification, whereby the usual loss of alcohol is obviated, by the means and in the manner substantially as set forth.

WM. HUTSON FORD,
J. DICKSON BRUNS,
L. C. CLARKE.

Witnesses:
 LYMAN HARDING,
 RUFUS R. RHODES.